Figure 1:
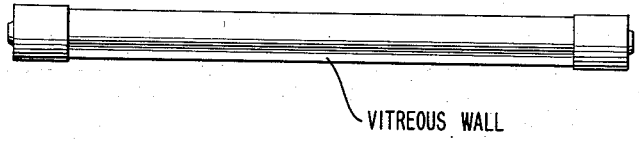

Nov. 25, 1958  J. A. ESCHER-DESRIVIERES  2,862,131
GLASS FOR GLOW DISCHARGE LAMPS SUCH AS FLUORESCENT
LUMINESCENT LAMPS AND THE LIKE
Filed March 15, 1954

INVENTOR.
JEAN ALFRED ESCHER-DESRIVIERES
BY
*Bauer and Seymour*
ATTORNEYS

United States Patent Office 2,862,131
Patented Nov. 25, 1958

2,862,131
GLASS FOR GLOW DISCHARGE LAMPS SUCH AS FLUORESCENT LUMINESCENT LAMPS AND THE LIKE

Jean Alfred Escher-Desrivieres, Paris, France, assignor to Societe Anonyme des Manufactures des Glaces et Produits Chimiques de St. Gobain, Chauny & Cirey, Paris, France Application March 15, 1954, Serial No. 416,080

Claims priority, application France February 27, 1951

14 Claims. (Cl. 313—112)

This is a continuation in part of application Ser. No. 273,351, filed February 25, 1952, now abandoned, and is entitled to the benefit of a foreign filing date of February 27, 1951.

Glow discharge lamps or tubes are sometimes divided into two classes called fluorescent when supplied with relatively low voltage and luminescent when supplied with high voltage, but these terms are not universally used and in this specification we will use the term "glow discharge" as generic. Said lamps are frequently mercury arc lamps provided with a fluorescent element constituted by a powder of convenient composition disposed on the inner side of the glass wall of the lamp. These glow discharge lamps emit ultra-violet radiations which are capable of producing unfavorable cutaneous and ocular reactions on people who are illuminated at close range by such lamps. As these lamps have otherwise many desirable qualities, these defects have limited and are increasingly limiting their use.

The harmful rays are those which have a wave length less than about 3,200 A., and the elimination of such rays relieves organisms from the harmful effects previously observed where glow discharge lamps are used.

It is an object of the invention to eliminate the harmful rays from the light emitted by glow discharge lamps without interrupting the other rays. This object is expressed, in terms of Angstrom units (A.) by the substantially complete elimination of all the wave lengths below about 3,200 A., while allowing the light of longer wave lengths to pass, in particular the light of visible wave lengths. Expressed in terms of transparency, an object is to invent a glass for use in glow discharge lamps which will be transparent to light of visible wave lengths but which is substantially wholly opaque to light of wave lengths below about 3,200 A.

Figure 2:
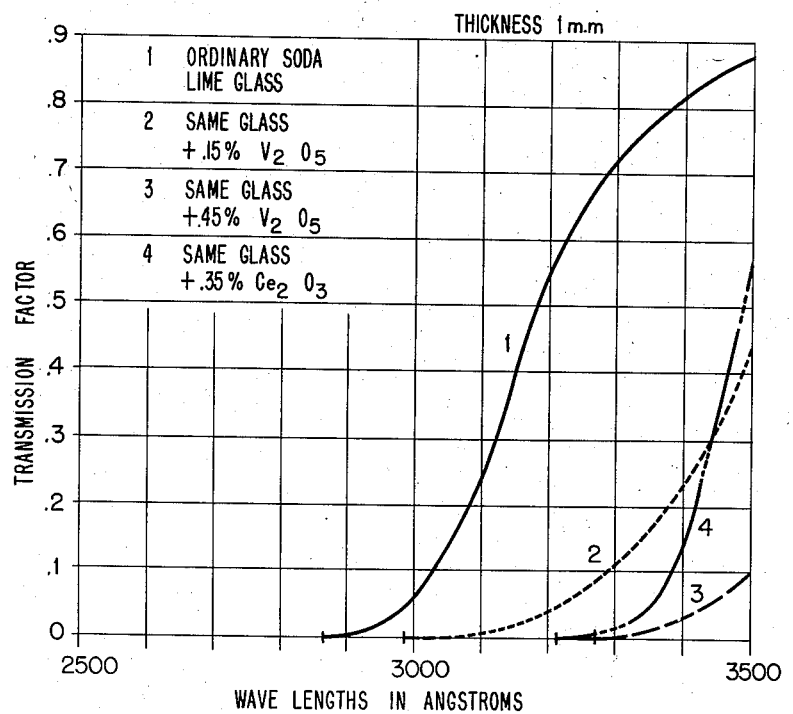

In the drawing accompanying the specification and forming a part thereof:

Fig. 1 is a view in elevation of a fluorescent lamp made in accordance with the invention, and Fig. 2 is a graph showing the transmission factor for various glasses, including typical glasses in accordance with the invention, plotted against the wave length of light in Angstroms.

The aforementioned drawbacks are avoided by the present invention which consists in making up the walls of fluorescent or luminescent lamps with a glass which contains ultra-violet absorbing oxides in such proportions that the walls stop the radiations of the wave lengths less than 3,200 A. and that the spectral characteristics of said walls for the visible spectrum as a whole are substantially unmodified by the presence of said oxides.

The objects of the invention are accomplished and the imperfection of the prior art glow discharge lamps is overcome by the present invention, which accomplishes the desired objects by employing a glass of any normal constitution, to the composition of which is added a small amount of cerium oxide, vanadium oxide or a mixture of them. The glasses thus made stop the ultra-violet rays that are harmful to skin and eyes, but allow the rays in the visible spectrum, thereabove, to pass substantially unchanged. This invention eliminates ultra-violet rays having a wave length less than about 3,200 A. but the appearance of the lamp and its color remain unchanged. Its desirable qualities are retained, and its harmful effect is eliminated.

A glass provided with the desired characteristics may be produced by introducing up to 1 or preferably .5% in weight of vanadium oxide or cerium oxide or a mixture of these oxides into the glass composition. As about a half weight percent or less of the said oxides is effective, it is not ordinarily useful to add more, but there is some minor variation in the percentage which produces the optimum effect with a particular glass.

Glow discharge lamps have been made for many years and there are many glass compositions which have been employed for their manufacture; such glasses have certain qualities such as softening point, coefficient of expansion, etc., which particularly fit them for the purpose, and it is not the function of this invention to alter such properties as have been recognized as desirable.

Our first experiments were carried out on typical soda-lime glasses, which are among those that have been extensively used in such lamps, and it was thereafter demonstrated by appropriate experiment that the principles which are successful with soda-lime glass are equally so with the other glasses used in the manufacture of glow discharge lamps and that in the many instances tested, an addition of less than 1% of the said oxides will produce the desired effect of eliminating the rays below 3,200 A.

Extensive experiments were carried out with glasses having compositions in the following ranges:

|  | Minimum | Maximum |
|---|---|---|
|  | Percent | Percent |
| SiO₂ | 65.0 | 85.0 |
| Alkalioxides | 4.5 | 18.0 |
| Earth Alkali oxides (including MgO) | 1.0 | 11.0 |
| Alumina | 0.7 | 2.5 |
| Fe₂O₃ | 0 | 0.1 |

A composition of glass which was extensively employed during the experiments which culminated in this invention was as follows:

| | Percent |
|---|---|
| SiO₂ | 70.62 |
| Al₂O₃ | 0.71 |
| Fe₂O₃ | 0.07 |
| CaO | 5.33 |
| BaO | 1.97 |
| MgO | 3.49 |
| Na₂O | 16.52 |
| K₂O | 1.01 |

The latter formula is frequently employed in making glow discharge lamps and it is that which was used as basic for the tests that follow. It is transparent to practically the whole spectrum down to about 2,890 A., for the thicknesses which are generally used in making the walls of glow discharge lamps. It was consequently an attainment of this invention to eliminate from transmission through such glasses the wave band between 2,890 A. and 3,200 A. without affecting the transmission of light of visible wave lengths.

The following examples illustrate the making of glasses which correspond to the principles of the invention:

A sample of the batch was taken having the basic composition set forth above and this was divided in four parts. The first part was made into a glass plate having parallel faces and being 1 mm. thick. To the second part was added .15% of V₂O₅ and it also was made into a glass plate of identical thickness. To the third part was added .45% of V₂O₅ and this too was made into a plate of identical thickness. To the fourth part was added .35% of Ce₂O₃ and an identical plate was made. The test plates thus made had identical appearance.

The samples were examined as follows:

A mercury vapour lamp used, with a wall of vitreous silica, of the type SCAD AM 102, lighting a quartz spectrograph. This spectrograph was provided with a movable frame enabling to successively take several photographs on the same emulsion. The emulsion used was a Guilleminot Spectroguil rapid 150 HD emulsion. The time of exposure was 1 min. in each instance.

The emission spectrum of the lamp was first photographed on the upper part of the plate without interposition of any glass sample. A spectrum was thus obtained. The movable frame was then displaced and sample number 1 was then placed very close to the slit of the spectrograph. The photograph of the spectrum of the light of the lamp, filtered by sample number 1, was thus obtained. A study of this spectrum shows that light passes through the sample number 1 of glass down to 2,890 A. and thus includes noticeable proportions of the harmful rays. The frame was displaced again and sample number 2, made of the glass that contained 0.15% of V₂O₅ was placed close to the slit of the spectrograph, using the same source of illumination. An immediate improvement is noted and the limit of the rays which pass through the glass is at about 2,970 A. An exposure number 3 was made in the same way, employing the glass containing 0.45% of vanadium oxide. The opaqueness of the glass was raised to a limit at 3,340 A. This cuts off all harmful rays below 3,200 A., and more those not harmful up to 3,340 A., leaving the visible spectrum substantially unchanged. The exposure numbered 4 was made in the same way by exposure through a glass containing 0.35% of cerium oxide which made the glass opaque to rays below 3,200 A.

By photographing all spectra on the same emulsion with the same exposure time, as indicated above, any variation in photographic emulsions or plates and in the conditions of development of said emulsions was eliminated and a perfect basis of comparison was established for the several spectra.

These results have been verified by tests made with the Bechmann spectrophotometer; the coefficients of transmission obtained with the different glasses are grouped in Fig. 2. We have also made photometric tests for visible light through plates of glass made from said different types of glass. All these tests have shown that with the thickness indicated, 1 mm., all these glasses have practically behaved alike, with respect to their transparency to visible light. It has therefore been established that the addition of small quantities of these two oxides, to glasses of otherwise known constitution, cuts off the harmful band of the ultra-violet without interfering with the transmission of light through the visible spectrum.

The same principles apply to all glass where it is desired to eliminate the harmful ultra-violet from the rays of these lights without otherwise impairing the visible light emitted. The glasses containing the added little quantities of cerium and vanadium oxide are not modified so far as their transparency to the various rays of the visible spectrum is concerned. For example, such glasses may have absorption bands for certain specific wave lengths, for instance, violet, and their characteristics with respect to such absorption bands remains practically unchanged after the addition of the said oxides.

I have established that an addition of .45% of vanadium oxide in a glass which is generally used for the manufacture of tubes of glow discharge lamps having a wall thickness about 1 mm. is sufficient to draw back the discernible limit of the absorption spectrum as far as 3,340 A. With an addition of .15% vanadium oxide, radiations the wave length of which is under 2,970 A. are stopped. Similar results are obtained with the glasses containing a cerium oxide percentage of the same range.

For these low percentages of vanadium or cerium oxides, the natural color of the glasses and their total transparency for the whole visible spectrum are not practically modified, under the thicknesses used for the walls of glow discharge lamps which may vary about from 1 mm. to about 1.7 mm.

As many apparently widely different embodiments of the present invention may be made without departing from the spirit and scope thereof, it is to be understood that the invention is not limited to the specific embodiments.

What is claimed is:

1. A glow discharge lamp having a light source which emits rays above and below 3,200 A., and a glass wall associated with said source in protective relation thereto, said wall being of the composition of an ordinary soda-lime glass and also containing on the order of .15%–1% by weight of at least one of a group of oxides consisting of cerium oxide and vanadium oxide.

2. A glow discharge lamp having a light source which emits rays above and below 3,200 A., and a glass wall associated with said source in protective relation thereto, said wall being transparent to visible light and consisting essentially of a glass having a wall thickness of about 1–1.7 mm. containing about .15 to 1% of at least one of a group consisting of vanadium oxide and cerium oxide, and containing .7–2.5% alumina.

3. A lamp or a glow discharge tube of which the wall is constituted by a glass having a composition containing at least one oxide, of the type of cerium and vanadium oxides, which possesses the property of absorbing ultra-violet rays, in such proportions that the wall stops the ultra-violet rays having a wave length less than about 3,200 A. and that the spectral characteristics of said wall for the whole of the visible light are practically unchanged by the presence of said oxide.

4. A lamp or a glow discharge tube according to claim 3 of which the wall is constituted by a glass containing less than 1.0% and preferably less than .5% vanadium oxide.

5. A lamp or a glow discharge tube according to claim 3 of which the wall is constituted by a glass containing less than 1.0% and preferably less than .5% cerium oxide.

6. A lamp or a glow discharge tube according to claim 3 of which the wall is constituted by a glass containing less than 1.0% and preferably less than .5% of mixed vanadium and cerium oxides.

7. A glow discharge lamp having a light source which emits rays above and below 3,200 A., and a glass wall associated with said source in protective relation thereto, said wall having a thickness of about 1–1.7 mm., and being composed of soda lime glass containing a major amount of silica, about .15 to 5% of at least one of a group consisting of vanadium oxide and cerium oxide, and a minor amount of alumina.

8. The lamp of claim 7 in which the alumina is between about .7 and 2.5%.

9. A lamp or a flow discharge tube of which the wall is constituted by a glass containing by weight:

|  | Minimum | Maximum |
| --- | --- | --- |
|  | Percent | Percent |
| SiO₂ | 65.0 | 85.0 |
| Alkali oxides | 4.5 | 18.0 |
| Earth alkali oxides (including MgO) | 1.0 | 11.0 |
| Alumina | 0.7 | 2.5 |
| Fe₂O₃ | traces | 0.1 |
| V₂O₅ | 0.15 | 1.0 |

10. A lamp or a glow discharge tube of which the wall is constituted by a glass containing by weight:

|  | Minimum | Maximum |
|---|---|---|
|  | Percent | Percent |
| $SiO_2$ | 65.0 | 85.0 |
| Alkali oxides | 4.5 | 18.0 |
| Earth alkali oxides (including MgO) | 1.0 | 11.0 |
| Alumina | 0.7 | 2.5 |
| $Fe_2O_3$ | traces | 0.1 |
| $Ce_2O_3$ | 0.15 | 1.0 |

11. A lamp or a glow discharge tube of which the wall is constituted by a glass containing by weight:

|  | Minimum | Maximum |
|---|---|---|
|  | Percent | Percent |
| $SiO_2$ | 65.0 | 85.0 |
| Alkali oxides | 4.5 | 18.0 |
| Earth alkali oxides (including MgO) | 1.0 | 11.0 |
| Alumina | 0.7 | 2.5 |
| $Fe_2O_3$ | traces | 0.1 |
| $V_2O_5 + Ce_2O_3$ | 0.15 | 1.0 |

12. A glow discharge lamp having a glass wall impermeable to ultraviolet rays having a wave length less than about 3200 A. and transparent to ultraviolet rays having a wave length greater than about 3200 A.

13. An electric discharge lamp having a glass wall interiorly coated with a layer of fluorescent material, and having a composition containing at least one ultra-violet-absorbing oxide in quantity and quality sufficient to arrest ultra-violet spectrum wave lengths shorter than about 3200 A. without substantially diminishing the visible spectrum wavelengths.

14. The lamp of claim 13 in which the said wall contains about .15%–1% of the group vanadium and cerium oxides, and .7% to 2.5% alumina.

References Cited in the file of this patent
UNITED STATES PATENTS

| 1,726,635 | Taylor | Sept. 3, 1929 |
| 2,413,940 | Bickford | Jan. 7, 1947 |
| 2,581,440 | Pincus | Jan. 8, 1952 |
| 2,582,453 | Pincus | Jan. 15, 1952 |
| 2,599,349 | Ricker | June 3, 1952 |